United States Patent [19]
Topsoe

[11] Patent Number: 5,169,717
[45] Date of Patent: Dec. 8, 1992

[54] METHOD OF PREPARING AMMONIA

[75] Inventor: Haldor F. A. Topsøe, Vedbæk, Denmark

[73] Assignee: Haldor Topsoe A/S, Denmark

[21] Appl. No.: 634,118

[22] PCT Filed: Jun. 19, 1989

[86] PCT No.: PCT/DK89/00149
§ 371 Date: Dec. 28, 1990
§ 102(e) Date: Dec. 28, 1990

[87] PCT Pub. No.: WO90/00153
PCT Pub. Date: Jan. 11, 1990

[30] Foreign Application Priority Data

Jul. 1, 1988 [DK] Denmark .............................. 3659/88

[51] Int. Cl.$^5$ .......................... C01C 1/04; H01M 8/14
[52] U.S. Cl. .................................. 423/359; 423/653; 429/16
[58] Field of Search ................... 429/16; 423/652, 653, 423/359

[56] References Cited

U.S. PATENT DOCUMENTS

| | | | |
|---|---|---|---|
| 3,488,226 | 1/1970 | Baker et al. | 429/16 |
| 4,309,359 | 1/1982 | Pinto | 429/16 |
| 4,522,894 | 6/1985 | Hwang et al. | 429/17 |
| 4,810,485 | 3/1989 | Marianowski et al. | 423/652 |

FOREIGN PATENT DOCUMENTS

| | | |
|---|---|---|
| 170277 | 2/1986 | European Pat. Off. |
| 195688 | 9/1986 | European Pat. Off. |
| 60-59672 | 4/1985 | Japan |
| 1309517 | 3/1973 | United Kingdom |

OTHER PUBLICATIONS

J. H. Altseimer et al., "Applications of Fuel Cells to the Petroleum Refining Industry", 1986 Fuel Cell Seminar, pp. 354-357.

J. R. Selman et al., "Structure and Performance of the Fuel electrode in the Molten Carbonate Fuel Cell", in Proceedings of the Symposium on Molten Carbonate Fuel Cell Technology, vol. 84-13.

*Primary Examiner*—Ferris Lander
*Attorney, Agent, or Firm*—Ostrolenk, Faber, Gerb & Soffen

[57] ABSTRACT

When producing ammonia in a conventional ammonia plant there is obtained a substantially improved process economy by incorporating a fuel cell into the ammonia plant. A gas stream rich in carbon dioxide, obtained during the production of ammonia, is passed to the cathode gas loop of the fuel cell; and/or a purged gas stream emanating from the process plant and containing one or more components usable as fuel for the fuel cell is fed to the anode chamber of the fuel cell. Finally, exhaust gas usable as fuel is passed from the anode chamber of the fuel cell to the front end of the process plant. An improved production of electricity is obtained in the fuel cell; and the stream rich in carbon dioxide formed in the ammonia plant is utilized, whereas normally it is a waste product.

5 Claims, 5 Drawing Sheets

METHOD OF PREPARING AMMONIA

FIELD OF THE INVENTION

The present invention relates to an improved method of preparing ammonia by integrating a Molten Carbonate Fuel Cell (MCFC) or an Integral Reforming Molten Carbonate Cell (IRMCFC) in a conventional process plant for the production of ammonia.

In industrial productions of ammonia, nitrogen from the air is reacted with hydrogen from a hydrogen source, e.g. a hydrocarbon or gasified coal. The ammonia synthesis process requires a significant amount of mechanical energy for make-up gas and recirculation compressors, process air compressor and refrigeration compressor.

Process plants for making ammonia are well known. They consist in principle of two main parts, i.e. a front end for preparing a suitable synthesis gas and a synthesis loop.

The front end comprises one or more reformer units where water vapour and preferably also air are added and transformation of hydrocarbons into a gas rich in hydrogen is brought about; a shift unit to convert carbon monoxide, which is a by-product from the reforming unit, into hydrogen and carbon dioxide; a unit to remove carbon dioxide; and a methanizing unit which will convert the last traces of carbon oxides into methane. Carbon dioxide is removed from the makeup gas and is often vented to the atmosphere if the plant is not designed for converting the product ammonia into urea.

It has now been found possible to improve the overall energy balance in the ammonia process by integrating certain fuel cells, especially of the Molten Carbonate type, in a conventional ammonia process plant, offering a possibility for using a purge gas containing hydrogen as well as an off-gas of carbon dioxide in a very efficient way.

BACKGROUND AND PRIOR ART

Fuel cells and more specifically Molten Carbonate Fuel Cells are well known in the art (J. R. Selman, T. D. Claar, "Proceedings of the Symposium on Molten CArbonate Fuel Cell Technology" Proceedings Volume 84-13, The Electrochemical Society, Inc.). In a fuel cell, chemical energy is converted directly into electrical energy. A fuel cell comprises electrodes: a cathode and an anode. The electrodes act as catalytic reaction sites where the fuel and oxidants are electrochemically transformed into electricity, water or carbon dioxide and heat. The electricity being produced as D.C. is conveniently transformed into A.C. before utilization, e.g. to fulfil the need (or some of the need) of a process plant.

The use of hydrogen-containing purge gas from a synthesis process is further disclosed in French patent specification No. 2,374,752 (Pinto). By the process there disclosed purge gas from, e.g., ammonia synthesis and containing only hydrogen, nitrogen, noble gases and methane is oxidized in a fuel cell to generate electricity. Residual gas from the fuel cell is recycled as fuel or process feed.

At the anode, fuel is oxidized electrochemically to give up electrons which are conducted through an external circuit to the cathode where the elecrons combine with the oxidant. The loop is closed by ions which are conducted through an electrolyte from one electrode to the other.

Molten Carbonate Fuel Cells are known in two principally different forms, i.e. simple Molten Carbonate Fuel Cells (MCFC) and Internal Reforming Molten Carbonate Fuel Cells (IRMCFC). The main characteristics of these two forms of Molten Carbonate Fuel Cell are given in Table 1:

TABLE 1

|  | MCFC | IRMCFC |
| --- | --- | --- |
| Electrolyte | $K_2CO_3$—$Li_2CO_3$ | $K_2CO_3$—$Li_2CO_3$ |
| Electrolyte support | $LiAlO_2$ | $LiAlO_2$ |
| Electrodes (catalysts) | Ni, NiO | Ni, NiO |
| Anode fuel | $H_2$, CO | Natural gas, $H_2$, CO |
| Cathode oxidant | Air + $CO_2$ | Air + $CO_2$ |
| Temp., °C. | 600–700 | 600–700 |
| Pressure | <120 psia [<8.437 kg/cm$^2$ abs.] | <120 psia [<8.437 kg/cm$^2$ abs.] |
| Cell voltage, V | <0.85 | <0.85 |
| Impurity tolerance | No $H_2S$ | No $H_2S$ |
| Anodic reaction (example) | $H_2 + CO_3^{-2} \rightarrow H_2O(g) + CO_2 + 2e^-$ | $CH_4 + 2H_2O \rightarrow CO_2 + 4H_2$ <br> $4H_2 + 4CO_3^{--} \rightarrow 4CO_2 + 4H_2O + 8e^-$ |
| Total |  | $CH_4 + 4CO_3^{--} \rightarrow 5CO_2 + 2H_2O + 8e^-$ |
| Cathodic reaction (example) | $CO_2 + \frac{1}{2}O_2 + 2e^- \rightarrow CO_3^{-2}$ | $4CO_2 + 2O_2 + 8e^- \rightarrow 4CO_3^{--}$ |
| Overall reaction | $H_2 + \frac{1}{2}O_2 \rightarrow H_2O(g)$ | $CH_4 + 2O_2 \rightarrow CO_2 + 2H_2O$ |
| Fuel used in example | $H_2$ | $CH_4$ |

An MCFC uses hydrogen and/or carbon monoxide as fuel and needs an oxidant comprising oxygen (air) and carbon dioxide as shown in Table 1.

The production of electricity will cause a migration of carbonate ions from the cathode to the anode, and carbon dioxide is produced at the anode and consumed at the cathode. Therefore, a continuous transfer of carbon dioxide from the anode back to the cathode—"carbon dioxide sweeping"—is required. The carbon dioxide sweeping is usually accomplished by post combustion of the anode exhaust gas. This post combustion causes an appreciable reduction of the obtainable conversion of fuel into electricity.

As shown in Table 1, an IRMCFC can use methane (natural gas), hydrogen and/or carbon monoxide as fuel and needs an oxidant containing oxygen (air) and carbon dioxide.

At the anode, carbon dioxide is produced. An IRMCFC isolated from a chemical process plant will need "carbon dioxide sweeping" in much the same way as an MCFC.

The term "fuel cell" as used hereinafter means stacks of fuel cells. Normally, fuel cells are used in series, stacks, in order to provide for a sufficient voltage.

The combination or integration of chemical and fuel cell process units is known in principle.

J. H. Altseimer et al. (Fuel Cell Seminar, Oct. 26–29, 1986 Sheraton El Conquistador Tucson, Ariz.) mention the application of fuel cells to the petroleum refining industry as a supplemental energy source to existing power and steam generating systems. However, no further description of the integration of fuel cells in the refinery processes is given.

It has further been proposed to integrate a heat exchange reformer such as described for instance in European patent specification No. 195,688 and a fuel cell (a phosphoric acid fuel cell). According to this concept, fuel in the form of natural gas is reformed in a reaction with steam into hydrogen which is utilized in the fuel cell for production of electrical power. The anode exhaust gas is utilized as fuel in the reformer, and steam raised from the fuel cell waste heat is used for the reforming process.

EP Patent Application No. A2-0-170277 discloses a power plant comprising a molten carbonate fuel cell, a reformer for reforming fuel into a reaction gas for the anode of the cell and a combustor to burn the exhaust gas from the anode and to supply the burnt exhaust gas to the cathode.

U.S. Pat. No. 4,522,894 (Hwang et al.) describes a fuel cell power plant using an autothermal reforming process on-site using generation of the hydrogen-rich fuel to be supplied to the anode side of the fuel cell. The cathode vent gas is fed to the autothermal reactor and the anode ent gas is fed to the catalytic burner to preheat the inlet stream to the reformer.

U.S. Pat. No. 3,488,226 (Baker et al.) shows a process for the generation of hydrogen from hydrocarbons by low pressure steam reforming and use thereof in Molten Carbonate Fuel Cells. The reforming reaction is carried out in a heat exchange relationsship with the fuel cell whereby the fuel cell heat sustains the endothermal reforming reaction. The reforming reaction step takes place on a catalyst located in the anode chamber of the fuel cell. The spent fuel from the anode is burnt off for providing further heat to the endothermal reforming reaction.

GB Patent Specification No. 1,309,517 (Fischer et al.) describes a fuel cell for transforming combustion enthalphy of hydrocarbons into electrical energy. Some of the exhaust gases generated flow together with combustion air not consumed in the modules through a porous catalyst where it is burnt in order to cover the heat requirements for the endothermal reforming reaction on the anodes of the fuel cell modules.

U.S. Pat. No. 4,524,113 (Lesieur) discloses the operating of a molten carbonate fuel cell by contacting the catalyst-containing anode of the fuel cell with methanol in the presence of water. The methanol is hereby caused to steam reforming inside the fuel cell hereby producing carbon monoxide, carbon dioxide and hydrogen, which is used as fuel for the anode.

Japanese Patent Specification No. 60-59672 (cf. Patent Abstract of Japan, abstract of JP 60-59672, vol. 9, No. 193, publ. 85-04-06) discloses a method having for its purpose to effectively use purge gas by using as fuel gas as cell purge gas mainly comprising hydrogen, nitrogen and argon produced in the ammonia synthesis industry. Hereby a purge gas containing hydrogen, nitrogen and argon, and practically free from CO and $CO_2$ generated in the ammonia synthesis process is supplied to an alkaline fuel cell as a hydrogen source. Use for fuel cell of purge gas is very effective compared with use for boiler. Since the content of CO and $CO_2$ in purge gas is negligible compared with that in hydrogen from a hydrogen bomb, when purge gas is used as hydrogen source of alkaline fuel cell, generation of $Na_2CO_3$ is very small and life of the cell is increased.

Thus, this known method utilizes alkaline fuel cells, whereas the method according to the present invention utilizes Molten Carbonate Fuel Cells or Internal Reforming Molten Carbonate Fuel Cells.

BRIEF DESCRIPTION OF THE INVENTION

As thus will be understood, the present invention relates to an improved method of preparing ammonia by integrating a process plant based on process technology known per se for this purpose and a Molten Carbonate Fuel Cell or an Internal Reforming Molten Carbonate Fuel Cell.

The main features of the method of the invention are:
Ia) passing a carbon dioxide containing stream obtained during the ammonia preparation process to the cathode gas loop of the fuel cell and
Ib) passing a purge gas stream from the process plant containing one or more components usable as fuel in the fuel cell to the anode chamber of the fuel cell, and
II) passing exhaust gas usable as fuel from the anode chamber of the fuel cell to the front end of the process plant.

In a preferred embodiment of the method of the invention, the carbon dioxide containing stream is an off gas stream from a carbon dioxide recovery unit. Such a carbon dioxide rich stream is usually vented.

Many process plants need high pressure steam, e.g. as part of a reformer feed. Likewise, many process plants can utilize high pressure steam as motive power.

In a further preferred embodiment of the method of the invention, surplus heat produced by the fuel cell is used to raise high pressure steam, which may be used in the process plant.

BRIEF DESCRIPTION OF THE DRAWINGS

The invention is to be explained below with reference to the drawings, wherein.

In the figures, arrows indicate direction of flow. Dashed lines are used for optional connections and/or directions of flow.

The figures are simplified and not all individual units, heat exchangers or pumps etc. have been shown. Neither have all utility installations or connections been shown. The electrical connections and installations pertaining to a fuel cell are not shown.

DETAILED DESCRIPTION OF THE INVENTION

Figure 1:
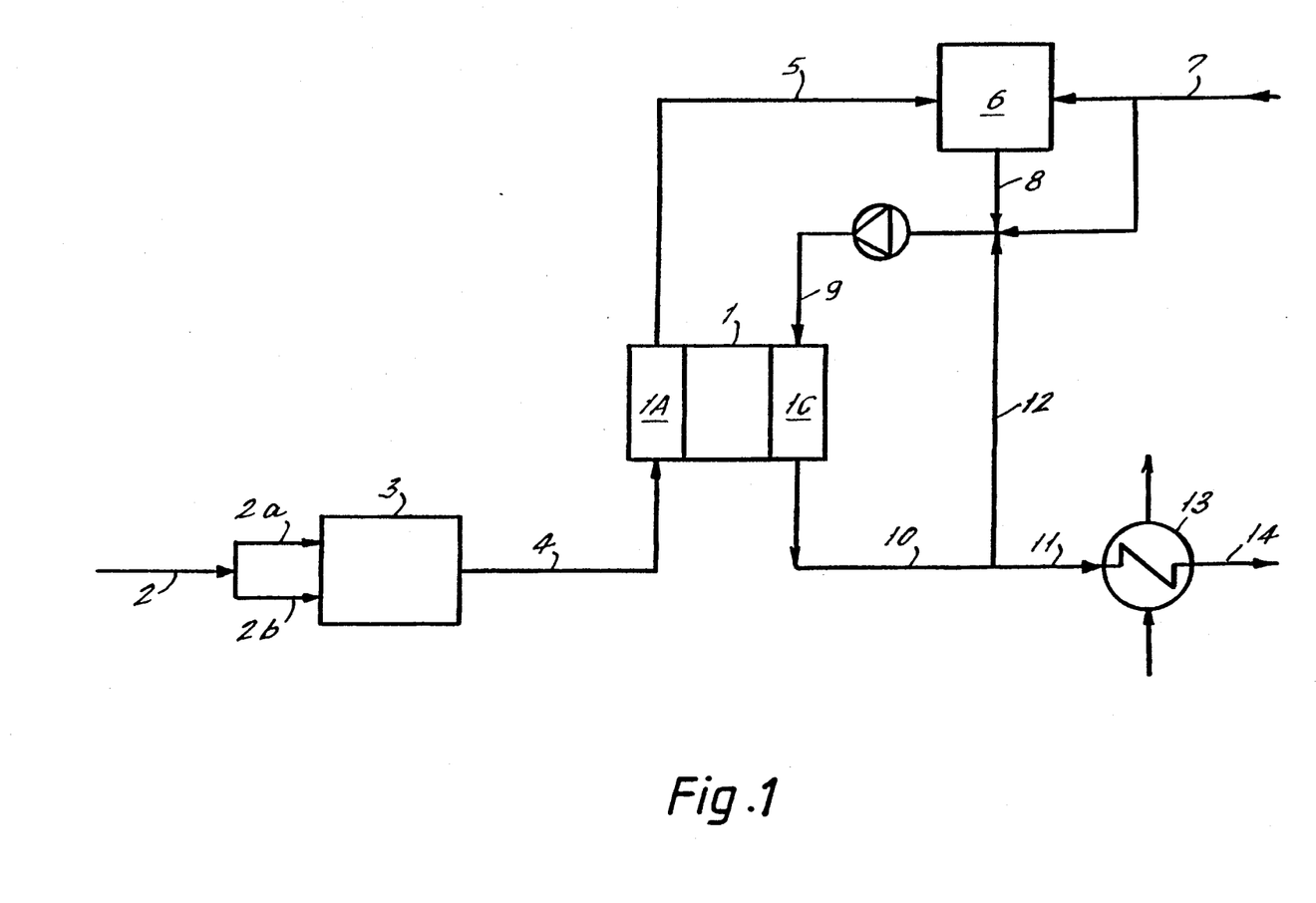
FIG. 1 shows a process flow sheet for a MCFC fuel cell system.

FIG. 1 shows a process flow sheet for an MCFC fuel cell system. In this flow sheet
1 is a fuel cell comprising anode 1A, cathode 1C and an electrolyte,
2 is a supply line of natural gas used as raw material, 2a being the process gas entry, 2b the fuel entry,
3 is a steam reformer unit, 4 is a transfer line of prepared feed from the reformer to the fuel cell,
5 is a transfer line of anode exhaust gas to the post combustion,
6 is a post combustion unit,
7 is a supply of air,
8 is an off gas line from the post combustion,
9 is a feed gas line to the cathode with a blower,
10 is an off gas line from the cathode,
11 is a purge line,
12 is a line for recycling cathode off-gas,
13 is a waste heat recovery boiler, and
14 is a vent.

In the reformer 3, a part of the natural gas supplied through the process gas entry line 2a is converted by steam reforming according to the reactions As a result, a feed suitable for the fuel cell is produced. A typical composition is (all figures referring to the dry basis; percent by volume):
76.0% $H_2$
15.1% $CO$
7.7% $CO_2$
1.2% $CH_4$ This feed is transferred by way of the transfer line 4 into the anode 1A of the fuel cell 1. In this fuel cell, the feed is converted as per Table I hereinbefore, but the conversion is not complete and will usually be around 90%. The exhaust gas had typically the following composition (likewise percent by volume on the dry basis):
5.4% $H_2$
3.6% $CO$
89.9% $CO_2$
1.1% $CH_4$ and is transferred via the transfer line 5 into the post combustion wherein all combustibles are converted into $CO_2$ and $H_2O$ upon reaction with air being supplied via 7.

The resulting off gas, extra air and a part of the cathode off gas drawn via the recycle line 12 is blown into the cathode chamber 1C of the fuel cell 1 via the cathode feed gas line 9.

The net resulting off gas is taken via the purge line 11 to the waste heat recovery boiler 13 and from there vented via line 14.

Slightly more than 50% of the lower heating value of the hydrogen reacted in the anode chamber is converted into electricity. The remainder appears as waste heat.

The efficiency of the fuel cell system—produced electricity divided by the lower heating value of the natural gas introduced (i.e. stream 2) is 40-45%. The amount of combustibles in the postcombustion corresponds to about 15% of the natural gas comsumption.

Figure 2:
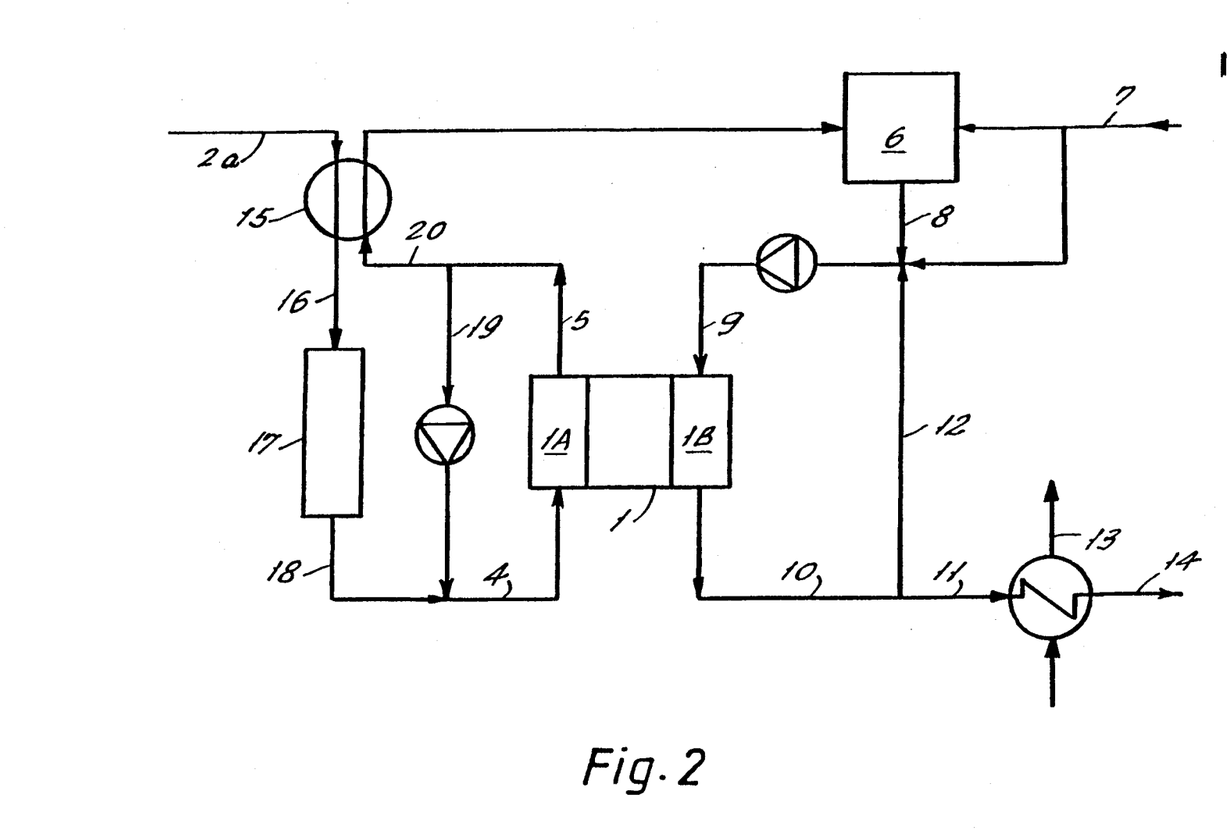
FIG. 2 shows a process flow sheet for an IRMCFC fuel cell system.

FIG. 2 shows a process flow sheet for an IRMCFC. In this flow sheet, the numerals 1-14 have the same meanings as in FIG. 1.
15 is a heat exchanger transferring heat between the raw material gas and anode exhaust gas,
16 is a transfer line,
17 is a fuel clean-up unit,
18 is a transfer line for clean feed,
19 is a recycle line with a blower, and
20 is a transfer line for net anode off gas The natural gas supplied through process gas entry line 2a is preheated in a heat exchanger 15 and taken to a fuel clean-up unit 17 where a possible sulphur content is reduced to below the very low limit necessary to comply with the tolerance limit of the fuel cell. The clean feed is taken to the anode chamber 1A of the fuel cell 1 via the transfer line 18 together with recirculated off gas via line 19. The anode off gas 5 is partly recycled via recycle line 19 and the net amount is transferred to the post combustion unit 6 via a heat exchanger 15. The combustibles in the off gas and air are converted in the unit 6 into $CO_2$ and $H_2O$. The resulting gas, drawn via off gas line 8, extra air and a part of the cathode off gas drawn via the recycle line 12 are blown into the cathode chamber 1C of the fuel cell 1 via the cathode feed gas line 9.

The cathode off gas is divided into a part being recirculated via line 12 and net off gas, which is taken to a waste heat recovery boiler 13 via purge line 11 and from there vented via the line 14.

Compared with the installation of an MCFC type fuel cell shown in FIG. 1, an external reformer 3 is omitted. The natural gas is converted to hydrogen inside the anode chamber over a suitable catalyst. By replacing an external reformer by an internal reformer the efficiency—as defined above (FIG. 1)—can be increased from 40-45% to slightly more than 60%. However, as for an MCFC an appreciable part, 12-14%, of the natural gas is converted to heat in connection with the carbon dioxide sweeping.

Figure 3:
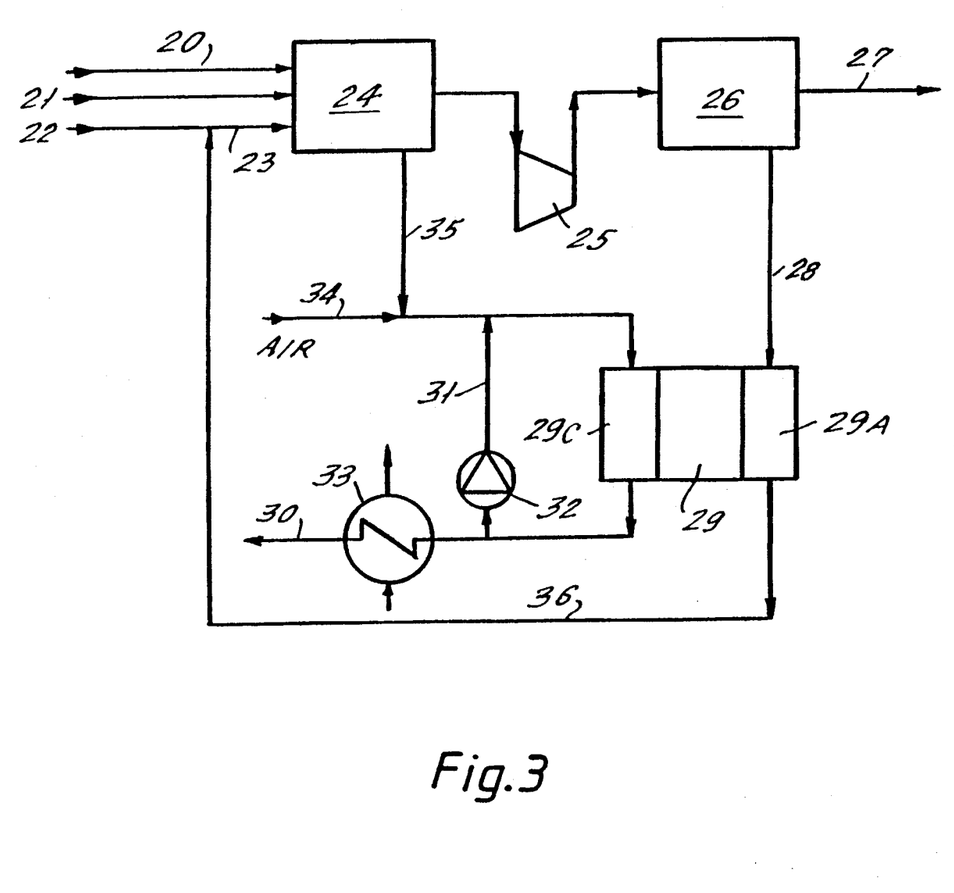
FIG. 3 shows a process flow sheet of the integration between an MCFC and an ammonia plant.

FIG. 3 shows a process flow sheet for the integration between an MCFC and an ammonia plant. The ammonia plant is exemplified by a conventional lay-out utilizing natural gas as feedstock as well as fuel. In this flow sheet
20 is a supply line for raw material,
21 is an inlet for air,
22 is a supply line for fuel,
23 is a common line for fuel from outside and recycled anode off gas,
24 is a front end of an ammonia plant,
25 is a synthesis compressor,
26 is an ammonia synthesis loop,
27 is an outlet line for ammonia produced,
28 is a purge line form the loop,
29 is a fuel cell with anode 29A and cathode 29C,
30 is a vent for net cathode off gas,
31 is a line for recycling cathode off gas,
32 is a circulator,
33 is a wasteheat boiler,
34 is an intake of air,
35 is a carbon dioxide stream from the front end, and
36 is a line for anode off gas from 29 to the front end 24.

The layout of the plant for synthesizing ammonia is conventional, i.e. a natural gas stream 20 is fed to the front end 24 comprising i.a. desulphurization, primary reforming, secondary reforming, carbon monoxide shifts, carbon dioxide removal and finally methanation to clean the gas for residual carbon oxides. The resulting synthesis gas is compressed in the compressor 25 and fed into a conventional ammonia synthesis loop 26. A product stream 27 of ammonia is taken from the loop 26. A purge stream comprising hydrogen, nitrogen and inerts such as methane and argon is taken via purge line 28 in order to keep the contents of inerts in the loop at an acceptable level. The purge stream is fed to the anode 29A of an MCFC 29 as fuel, and the resulting anode exhaust gas is added via line 36 to the fuel in line 22 for the front end 24. The stream 35 from a carbon dioxide removal unit of the front end is combined with a stream 34 of air and fed to a cathode gas recycle loop 31, 32, 33 of the MCFC as an oxidant. From the cathode exhaust gas the major part is recycled in the recycle loop 31 using a recirculation pump 32. The remainder of the cathode exhaust gas 30 is vented. The heat generated in the MCFC is used in a waste heat boiler 33 for raising steam which is utilized in the plant as process steam or for driving compressors, turbines etc.

Figure 4:
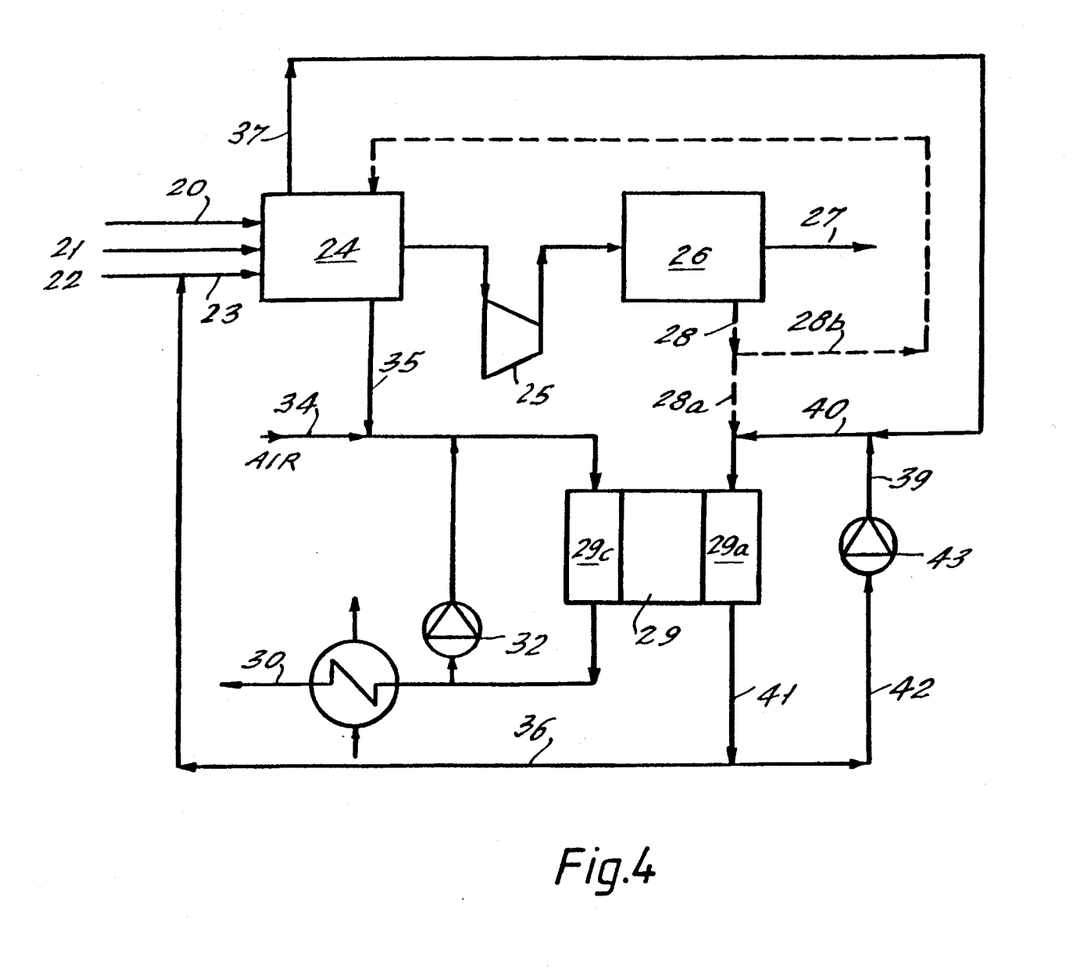
FIG. 4 shows a process flow sheet of the integration between an IRMCFC and an ammonia plant.

FIG. 4 shows a process flow sheet of an integration between an IRMCFC and an ammonia plant.

In this flow sheet numerals 20-36 have the same meanings as in FIG. 3.

28a is a line for transferring hydrogen purge gas from the loop into the anode feed line,
28b is a line for transferring hydrogen purge gas from the loop to the front end as fuel,
37 is a line for transferring a stream of desulphurized natural gas to the anode loop,
38 is a line for total anode chamber feed,
39 is a recycle line for anode off gas,
40 is a line for the total of recycled anode gas and desulphurzed natural gas,
41 is a line for anode off gas,
42 is a line for anode off gas to be recycled, and
43 is a recirculator.

The configuration is the same as that of FIG. 3 except for the supply of fuel to the fuel cell. The IRMCFC allows the hydrogen-rich stream 28 to be totally or partly replaced by natural gas, the stream in line 37. That stream is most conveniently drawn from the front end of the ammonia plant from the feed gas line after desulphurization. Furthermore, in order to accomplish the internal reforming in the anode chamber, it is necessary to maintain the anode circuit shown in FIG. 2, i.e. lines 42,39 with recycling 43.

Figure 5:
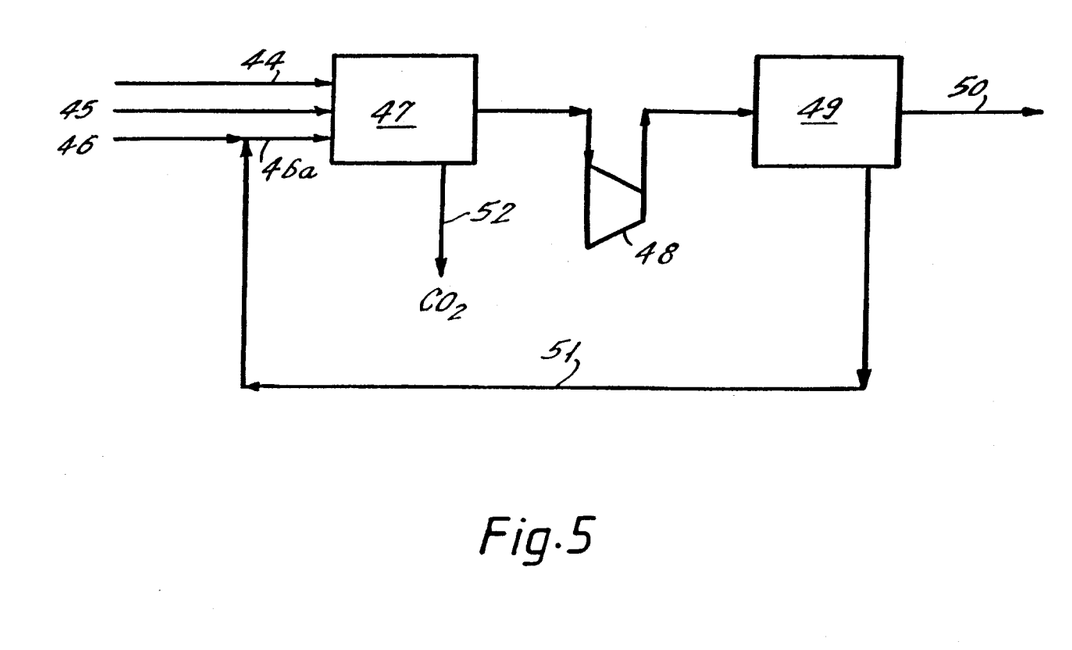
FIG. 5 shows a process flow sheet of a conventional ammonia plant using natural gas as raw material.

FIG. 5 shows a process flow sheet of a conventional ammonia plant using natural gas as raw material. In this flow sheet 44 is a supply line for raw material,
45 is an inlet for air,
46 is a supply line for fuel,
46 is a common line for fuel from outside and recycled purge gas,
47 is a front end of an ammonia plant,
48 is a synthesis gas compressor,
49 is an ammonia loop,
50 is an outlet line for ammonia produced,
51 is a purge line from the loop, and
52 is a line for off-gas ($CO_2$) from the front end.

The lay-out of the plant for synthesis of ammonia is conventional, i.e. a stream of natural gas is fed via the supply line 44 to a front end 47 comprising i.a. desulphurization, primary reforming, secondary reforming, carbon monoxide shifts, carbon dioxide removal and finally methanation. The resulting synthesis gas is compressed in a compressor 48 and fed into a conventional ammonia synthesis loop 49. From the loop a product stream of ammonia is taken via the outlet line 50. A purge gas comprising hydrogen, nitrogen, and inerts such as methane and argon is taken via line 51 in order to minimize the content of inerts in the loop. The purge stream is fed to the front end 47 as fuel. From the front end, the $CO_2$-stream from the $CO_2$-removal installation leaves the front end as off-gas via line 52.

The synthesis compressor 48 is a considerable power consumer. It is often turbine driven using high pressure steam as motive power.

EXAMPLES

The invention and the advantages obtained in using it are further explained in the Examples below.

EXAMPLE 1

Integration of an MCFC into an Ammonia Plant

Reference is made to FIG. 3 illustrating this embodiment of the invention.

A conventional lay-out of an ammonia plant (FIG. 5) and that of a separate MCFC power plant (FIG. 1) have been integrated by drawing a purge stream via line 28 from the synthesis loop 26 and introducing this purge stream as fuel to the anode 29A of the MCFC 29, drawing the anode exhaust gas stream via line 36 from the MCFC 29 and using this stream as fuel in the front end 24 of the ammonia plant, drawing a stream of carbon dioxide from the $CO_2$-removal unit of the ammonia plant front end 24 and introducing this stream 35 together with air 34 to the cathode recycle loop of the MCFC 29, introducing the steam raised in the waste heat recovery boiler 33 of the MCFC installation into the high pressure steam system of the ammonia plant (this introduction of steam raised in the waste heat boiler 33 into the steam system of the ammonia plant has not been shown), and omitting a separate feed conditioning set-up for feed to the MCFC.

The integration shown in FIG. 3 has the following advantages compared to a conventional ammonia plant of identical ammonia production capacity and a separate MCFC having the same electric output as that of the MCFC of the integrated set-up:

The greater part of the hydrogen contained in the purge gas stream from the synthesis loop is used more efficiently in the MCFC than otherwise possible. The rest of the hydrogen and the methane, i.e. the anode exhaust gas is used as fuel with the same efficiency as in a conventional set-up.

The loss of combustibles caused by conventional $CO_2$-sweeping in a separate MCFC set-up is avoided. The necessary supply of carbon dioxide to the cathode of the MCFC is taken from the off-gas stream of the $CO_2$-removal unit of the ammonia plant which stream would otherwise become wasted.

The waste heat produced in the MCFC can be utilized very efficiently in the ammonia plant.

The omission of a separate fuel conditioning set-up for the MCFC, especially a separate sulphur removal unit and a separate steam reformer, is a simplification which reduces the total capital cost considerably and improves the total efficiency.

Considered as a power plant, the integrated concept will have an efficiency—produced electricity divided by lower heating value of the consumed fuel gas—which is improved from 40-45% to slightly above 50%.

EXAMPLE 2

Integration of an IRMCFC into an Ammonia Plant

Reference is made to FIG. 4 illustrating this embodiment of the invention.

A conventional lay-out of an ammonia plant (FIG. 5) and that of a separate IRMCFC (FIG. 2) have been integrated by > drawing the anode exhaust gas stream via line 36 from the IRMCFC 29 and using this stream as fuel in the front end 24 of the ammonia plant,
>
> drawing a stream of carbon dioxide via line 35 from the $CO_2$-removal unit of the ammonia plant front end 24 and introducing this stream together with air 34 to the cathode recycle loop of the IRMCFC 29,
>
> introducing the steam raised in the waste heat recovery boiler 33 of the IRMCFC installation into the high pressure steam system of the ammonia plant (not shown),
>
> omitting a separate sulphur cleaning unit for conditioning fuel to the IRMCFC, and
>
> if desired using at least some of the purge gas from line 28a as feed to the fuel cell anode. The integration gives the following advantages:

The loss of combustibles caused by the $CO_2$-sweeping is avoided. The required carbon dioxide for the cathode is imported from the ammonia plant, carbon dioxide is a by-product in the ammonia production and is often vented. The anode exhaust gas substitutes natural gas as fuel in the ammonia plant. The waste heat produced in the fuel cell can be utilized very efficiently in the ammonia plant.

The total advantages are considerable. The efficiency obtained by the integrated plant considered as a power station compared with production of electricity in a separate IRMCFC is improved from a little above 60% to slightly more than 70%.

INDUSTRIAL USE OF THE INVENTION

By integrating a conventional ammonia plant with an MCFC or—still better—an IRMCFC, the production of electricity in the cells will be highly improved; and moreover waste gases such as $CO_2$ will be utilized. Hence the invention will reduce the "greenhouse effect" at a global perspective.

It is expected that worldwide ammonia production will soon be carried out according to the principles of the present invention.

I claim:

1. A method of preparing ammonia in an ammonia plant comprising a synthesis gas preparation section and an ammonia synthesis loop, having integrated therein a molten carbonate fuel cell, and comprising the steps of passing a purge gas stream from the ammonia synthesis loop containing one or more components usable as fuel in the fuel cell to the anode chamber of the fuel cell, and passing exhaust gas usable as fuel in the synthesis gas preparation section of the ammonia plant from the anode chamber of the fuel cell to said gas preparation section, said method further comprising passing a carbon dioxide containing stream obtained from the synthesis gas preparation section to a cathode gas loop of the fuel cell.

2. A method as claimed in claim 1, wherein the carbon dioxide containing stream is an off gas stream obtained from a carbon dioxide removal unit in said synthesis gas preparation section.

3. A method as claimed in claim 1 wherein a part of the energy obtained in the fuel cell is in the form of surplus heat.

4. A method as claimed in claim 3, wherein the surplus heat is utilized to generate high pressure steam for use in said ammonia plant.

5. A method as claimed in claim 1, wherein the molten carbonate fuel cell is an internal reforming molten carbonate fuel cell.

* * * * *